(12) United States Patent
Spurlin

(10) Patent No.: US 6,202,994 B1
(45) Date of Patent: Mar. 20, 2001

(54) HIGH ENERGY SPRING FOR VIBRATORY DEVICES

(76) Inventor: William Spurlin, 202 Locust St., Indiana, PA (US) 15701

( * ) Notice: Subject to any disclaimer, the term of this patent is extended or adjusted under 35 U.S.C. 154(b) by 0 days.

(21) Appl. No.: 09/447,828

(22) Filed: Nov. 23, 1999

(51) Int. Cl.⁷ ..................................... F16M 1/00
(52) U.S. Cl. ...................... 267/136; 198/752.1; 267/141; 267/152
(58) Field of Search .................... 188/378–380; 267/136, 141, 152, 153, 140.5, 292–294, 141.5, 141.4; 53/493, 502; 74/61, 87; 198/770, 763, 760, 766, 767, 752.1, 769, 754; 209/366.5, 367, 365.3, 364; 248/638

(56) References Cited

U.S. PATENT DOCUMENTS

| | | | |
|---|---|---|---|
| 4,218,929 | 8/1980 | Spurlin | 74/61 |
| 4,272,366 | 6/1981 | Dean et al. | 209/364 |
| 4,530,431 | * 7/1985 | Spurlin . | |
| 4,754,870 | 7/1988 | Hallman | 198/770 |
| 4,795,552 | 1/1989 | Yun et al. | 209/319 |
| 5,366,210 | 11/1994 | Grunau et al. | 267/140.4 |
| 5,547,068 | 8/1996 | Spurlin | 198/760 |
| 5,695,176 | 12/1997 | Colford | 267/155 |
| 5,884,893 | 3/1999 | Seki et al. | 248/638 |

OTHER PUBLICATIONS

Product Literature for Shinko Electric—"2 Mass Vibrating Screen", one page.
Product Literature for Syn–Energy—"A New Vibratory Feeder!", two pages.
Product Literature for Syn–Energy—"Mechanical Vibrating Conveyors", two pages.
Product Literature for Eriez Magnetics—"Mechanical Feeders", 4 pages.

* cited by examiner

Primary Examiner—Douglas C. Butler (57) ABSTRACT

Mounting of cylindrical elastomer springs in a two-mass vibratory device is accomplished in order to provide contact area between the spring members and the masses of the vibratory device. Heat generated within the springs during operation of the vibratory device degrades the performance of the elastomer element within the springs. By mounting the cylindrical elastomer springs at multiple points in contact with the large surface areas available in a typical vibratory device, heat generated within the springs is dissipated by the masses of the vibratory device. By removing heat, the performance of the elastomer spring is increased; therefore, enabling the use of springs of a higher spring rate within the same mounting area.

8 Claims, 7 Drawing Sheets

PRIOR ART

HIGH ENERGY SPRING FOR VIBRATORY DEVICES

BACKGROUND OF THE INVENTION

1. Field of Invention

The present invention relates generally to the field of vibratory devices operable as a two-mass vibrating systems moving bulk material in a linear direction as a feeder, conveyor, packer, scavenger, screen, grizzley or foundry shakeout. The method and apparatus of the present invention has particular application to a new method of attaching resilient members between the two-masses of such a vibrating device, to thereby increase the spring rate (lbs/in.) within a defined mounting space.

Two devices incorporating the present invention are briefly described in the present disclosure. Full and complete descriptions of the devices themselves are located within commonly invented U.S. Pat. Nos. 4,218,929 and 5,547,068, hereby incorporated by reference.

2. Discussion of Prior Art

Two-mass vibratory work conveyors, known in the art, incorporate a number of different types of resilient members in order to control the transference of energy between the two masses. One popular type of resilient member which provides exemplary performance is cylindrical elastomer springs. The problem of degraded performance of the elastomer due to increased temperatures within the springs, however, has not been adequately addressed as indicated in the following discussion of related prior art.

The patent to Spurlin (U.S. Pat. No. 4,218,929), the present inventor, provides for a vibratory feeder which supports a trough mass above an exciter mass on rectangular elastomer springs rather than cylindrical elastomer springs. In addition, the spring's inner support is connected to the trough at a single point, while the outer support is connected to the exciter mass in two places.

The patent to Dean et al. (U.S. Pat. No. 4,272,366) provides for a Heavy Duty Two Mass Vibratory Machine. The vibratory apparatus of this device connects the two masses using a plurality of resilient members. The resilient members described, however, are not cylindrical elastomeric springs and therefore no teaching of heat-sinking an inner or outer tubular member is provided.

The patents to Hallman et al. (U.S. Pat. No. 4,754,870) and Yun et al. (U.S. Pat. No. 4,795,552) provide for two mass vibrating devices with resilient member mounting configurations representative of the prior art. The resilient means connecting the two masses are connected at both ends to the masses; however the resilient means are coil springs rather than cylindrical elastomer springs and the springs have one end attached to one mass and the other end attached to the other mass.

The patent Grunau et al. (U.S. Pat. No. 5,366,210) provides for a vibration absorber which maintains the elastomer's performance even during periods of heat buildup. A second spring assists the primary spring when the primary spring is degraded due to its temperature. No discussion of heat-sinking is provided, however.

The patent to Spurlin (U.S. Pat. No. 5,547,068), the present inventor, provides for a two-mass vibratory device functionally connected, using the prior art method, with cylindrical elastomer springs.

The patent to Colford (U.S. Pat. No. 5,695,176) provides for a vibration damper which uses a heat activated coating which swells in order to maintain pressure on an elastomeric spring whose performance is degraded due to increasing temperature.

The patent to Seki et al. (U.S. Pat. No. 5,884,893) provides for a cylindrical elastomer vibration isolator which assists in heat dissipation from an attached motor. However, in direct contradiction of the present invention, the elastomer is actually part of the heat sink and used to transport heat from the motor to a large surface area rather than the elastomer being the heat source.

Whatever the precise merits, features and advantages of the above cited references, none of them achieve or fulfill the purposes of the present invention. In particular, the prior art does not provide for a method of increasing the spring rate per mounting area by an improved method of dissipating heat from the elastomer and shaft within cylindrical elastomer springs which connect two masses in a two-mass vibratory device.

SUMMARY OF THE INVENTION

The present invention relates to vibratory feeders, conveyors, scavengers, separators, screens and other vibratory equipment used in materials handling and related fields. Such equipment has its motive force provided by an exciter of the type having unbalanced weights on a rotating shaft. The exciter, which constitutes one mass of a two-mass system, is coupled to a second mass, the work member, by an energy transferring resilient means. Also, the work member is typically suitably isolated from the ground or stationary structure so that it is regarded as a free mass.

Figure 1:
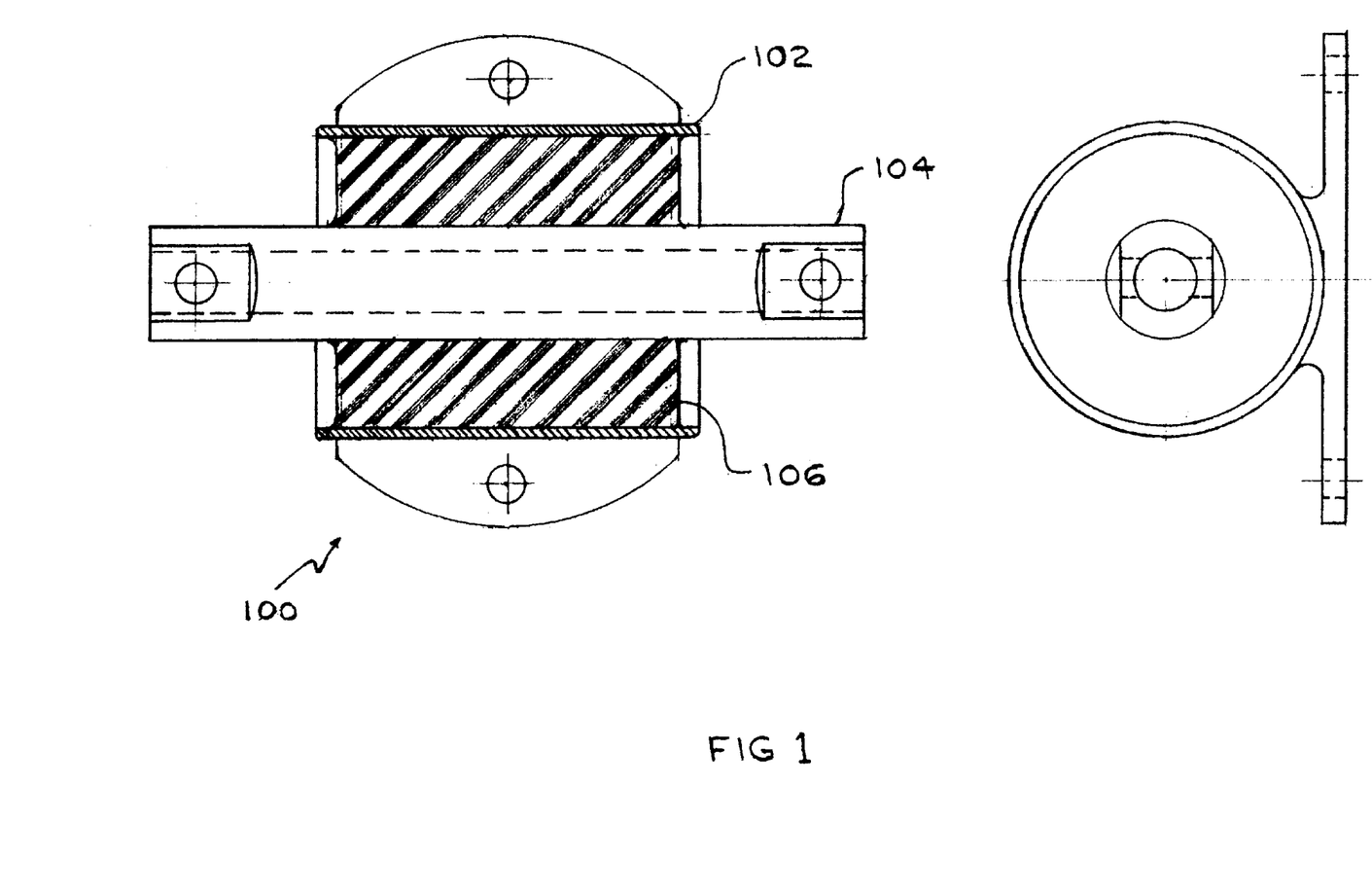
FIG. 1 illustrates the major components of a cylindrical elastomer spring according to the present invention.

A plurality of resilient members are used to connect the two masses in order to decouple the unwanted forces from the work member. One exemplary type of resilient member is a cylindrical (or tubular) elastomer spring as shown in FIG. 1. This type of spring has an inner shaft 104 within a surrounding cylindrical housing 102. The area between the shaft and housing is filled with an annular elastomer 106 bonded to each surface. The elastomer springs are mounted within a specified mounting area in a connection between the two masses.

In the prior art, during operation of a two-mass vibratory system, the elastomer and inner shaft in the cylindrical elastomer springs heat up due to internal damping or friction, thereby degrading the endurance and performance of the spring. The rise in temperature deteriorates the bond between the shaft and elastomer resulting in a decrease in spring rate which causes the operating frequency to approach the natural frequency and culminates in a catastrophic failure of the system. The present invention recognizes that both the work mass and exciter, in typical vibratory systems, are usually physically large and good heat conductors. The present invention therefore facilitates the dissipation of built-up heat from the elastomer and inner shaft of a cylindrical elastomer spring by attaching the spring to the larger members in a manner which increases the available surface area as a heat sink to enable heat dissipation. In particular, the inner shaft of the cylindrical elastomer springs is attached at both ends to one of the larger members which act as a heat sink for the inner shaft and the elastomer. By removing heat, the performance of the elastomer spring is increased, significantly improving the capability to have an increased spring rate in the same mounting area and thereby enabling the design of the vibratory system to be limited only by the strength of the materials of the spring (e.g. stress and bond areas).

The present invention provides for a simple design, a high energy cylindrical elastomer spring, which uses standard materials for more efficient manufacturing than prior art elastomer rectangular spring designs.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

As previously described, FIG. 1 illustrates a cutaway view of the general arrangement of a cylindrical elastomer spring 100 used in the present invention. Low damping elastomer 106 is bonded to outer cylindrical housing 102 and inner shaft 104. Housing 102 and shaft 104 are usually constructed from steel or other functionally equivalent materials. Bonding is accomplished using LORD CORPORATION bonding procedures and adhesives, as is generally known in the art. Suitable functionally equivalent bonding methods, also known in the art, are also contemplated within the scope of the present invention. Elastomer 106 inner and outer diameter dimensions are chosen to provide approximately a 10% preload of the elastomer. One exemplary elastomer is synthetic rubber marketed under the name NATSYN™, such an elastomer has a low percentage of damping (i.e. internal friction created by deflection).

The length of cylindrical elastomer spring 100, spring stiffness, shear stress limits of elastomer 106, and other operating characteristics are determined according to the specific vibratory device and application the spring will be subject to. Selection of the correct cylindrical elastomer spring with regards to the masses of the exciter and work mass, as well as the natural frequency of the vibratory device, is within the ordinary skill of a practitioner in this field. However, in the past, selection of spring rates in a specified mounting area were limited by reduced performance characteristics based on internal heat build-up.

During operation of a vibratory device, elastomer 106 and shaft 104 experience a rise in temperature due to the work being performed. The rise in temperature degrades the endurance and performance of elastomer 106 ultimately resulting in catastrophic failure of the device. Therefore, the resulting temperature must be considered when selecting a spring rate for the cylindrical elastomer spring thereby artificially limiting the acceptable range of the operating frequency. Heat is conducted from elastomer 106 to both inner shaft 104 and outer housing 102. Exposed surfaces of shaft 104 and housing 102 are only able to dissipate limited quantities of heat into the environment surrounding spring 100. The present invention takes advantage of other, larger surface areas present in a two-mass vibratory system to increase heat dissipation. The present invention therefore facilitates the dissipation of built-up heat from the elastomer and inner shaft of a cylindrical elastomer spring by attaching the spring to the larger members in a manner which increases the available surface area as a heat sink to enable heat dissipation and thereby increase the spring rate per mounting area of the spring and enabling the operating parameters to be designed without regard to the generated temperature.

The present invention limits the design of the spring system operating parameters only by the characteristics of the material, e.g., the stress and bond area. In the case of a spring configured for a two-mass vibratory apparatus of the preferred embodiment, a total stroke length of 0.625", is chosen to be a safe distance from the maximum total stroke length, of 0.650", and is only limited by the stress and bond area of the materials comprising the spring of the preferred embodiment and operation at a frequency near 1200 r.p.m. (natural frequency) In this scenario, the operating frequency may be safely chosen without regard to constraints dictated by a rise in temperature. On the other hand, a cylindrical "hot" spring of the prior art would be limited to a total stroke length of approximately 0.560" and an operating frequency of approximately 900 r.p.m. to maintain operation at a safe temperature.

Figure 2:
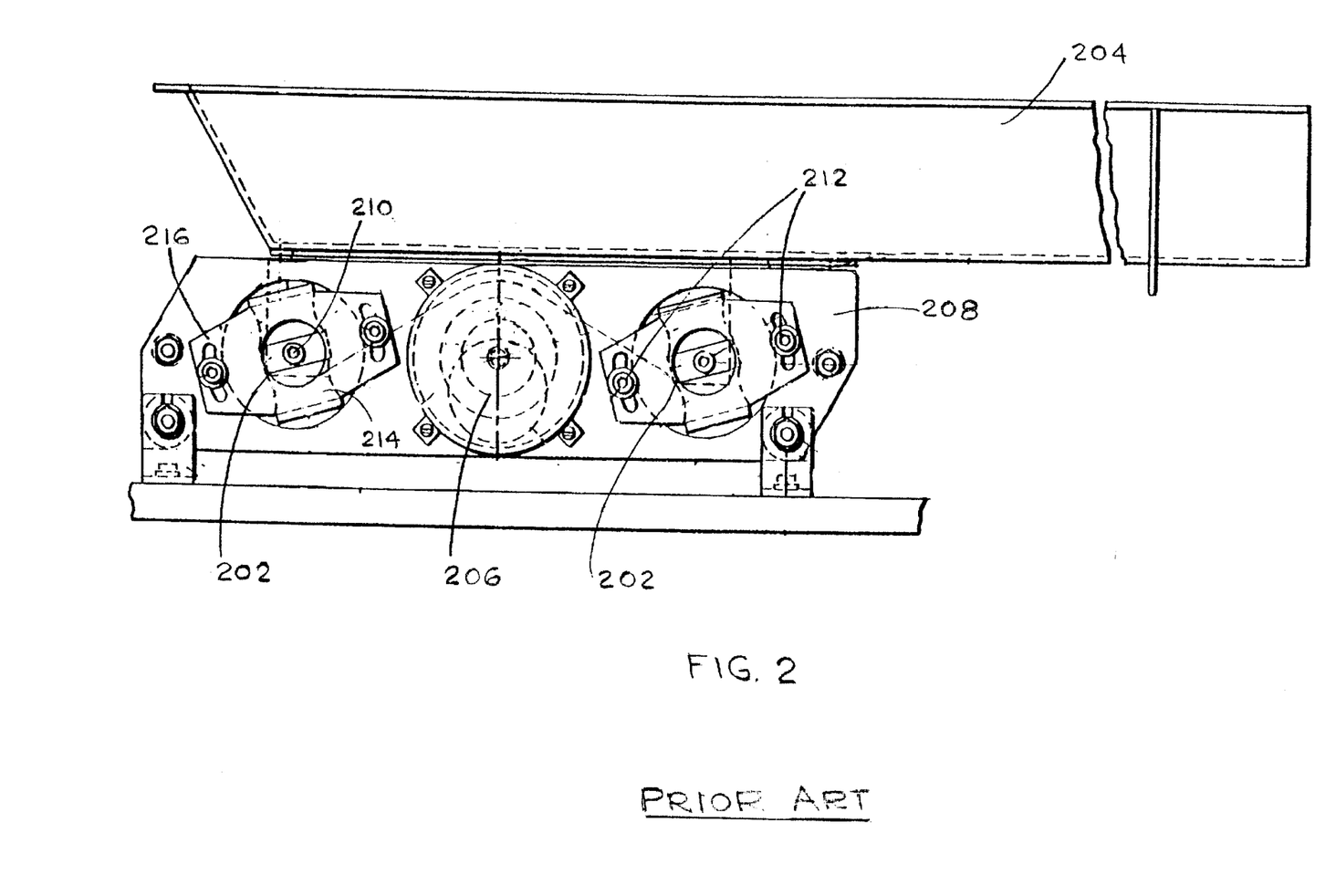
FIG. 2 illustrates a prior art method of connecting two-mass systems with flat rectangular springs.

FIG. 2 illustrates one embodiment of the present inventor's prior art method of connecting two masses of a vibratory device with flat, rectangular springs. Work member 204 is connected to exciter mass 208 through flat, rectangular springs 202. Also illustrated in FIG. 2 is exciter motor and shaft assembly 206. In this illustrated prior art method, rectangular spring 202 has central portion 210, elastomer 214 and outer region 216. Central portion 210 is attached to work member 204 while outer region 216 is attached to exciter mass 208 by bolts 212.

Figure 3:
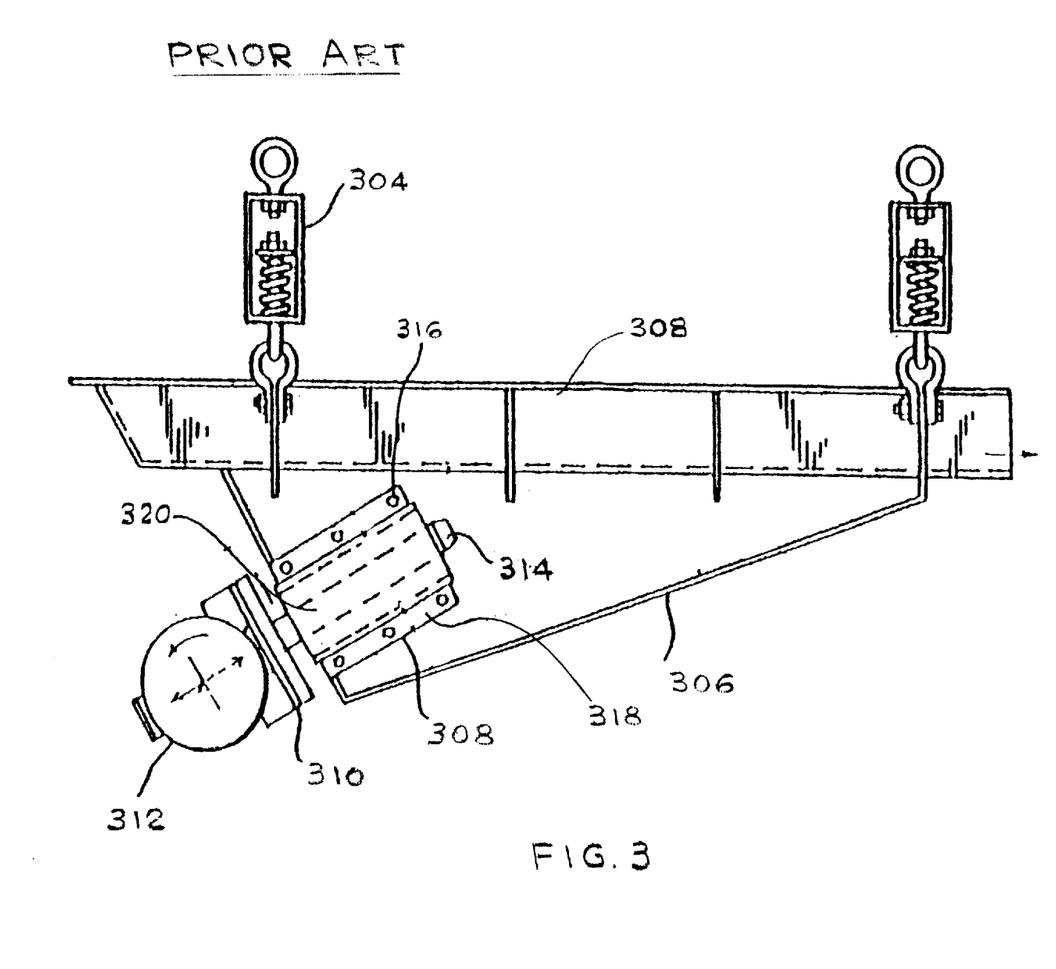
FIG. 3 illustrates a prior art method of connecting two-mass systems with cylindrical elastomer springs.

FIG. 3 illustrates one embodiment of the present inventor's prior art method of connecting cylindrical elastomer springs between the masses of a two-mass vibratory device. Trough 302 is suspended from isolation hangers 304 and is supported by center beam 306. Force from exciter 312 is transferred to center beam 306 through cylindrical elastomer spring 308 (see FIG. 1). The elastomer spring's outer housing 318 is connected to beam 306 using bolts 316 and a flange. Inner shaft 320 has one end connected to mounting plate 310 which is attached to exciter 312 and a second unattached end 314. This prior art arrangement provides little surface area at the free end of 314 to dissipate the excessive heat from both the inner shaft 320 and the spring elastomer which is generated during use of the vibratory device.

In contrast, the present invention configures the cylindrical elastomer springs so that both ends of an elastomer spring's inner shaft are connected to a large surface area as fully described hereafter.

Figure 4:
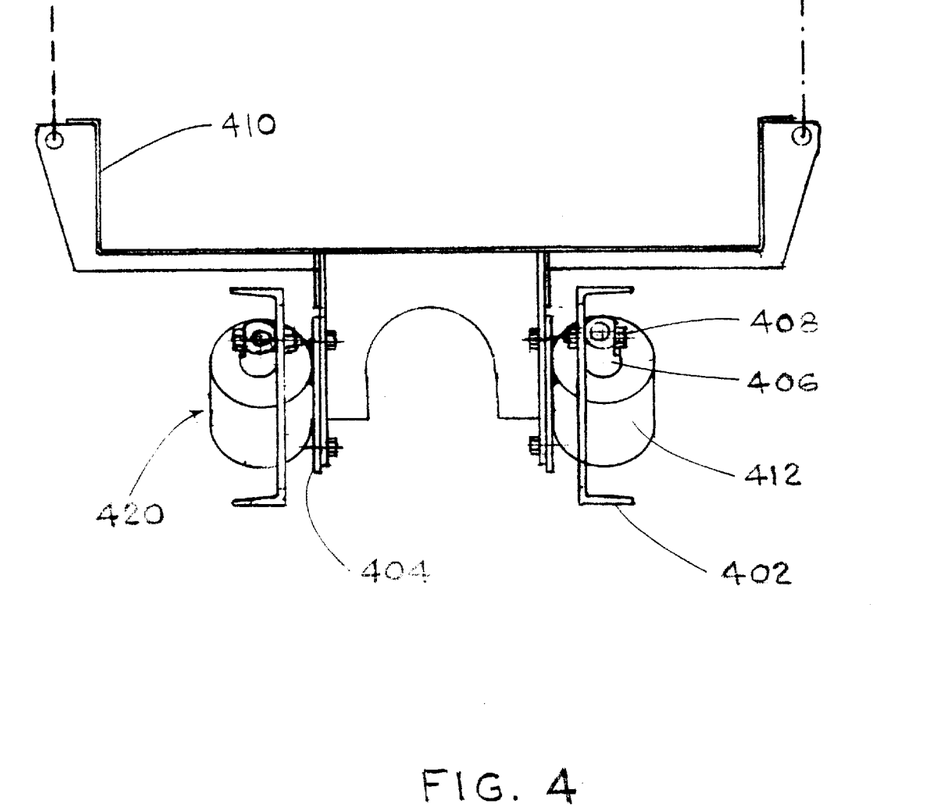
FIG. 4 illustrates an end view of the mounting arrangement between resilient members and an exciter mass and work mass according to the present invention.

The two-masses in a two-mass vibratory system typically are large and metallic, often steel, with large surface areas which conduct heat well. FIG. 4 illustrates an end view, according to the present invention, of mounting cylindrical elastomer springs 420 which utilizes both exciter mass 402 and work mass 410 to act as a heat sink to provide heat dissipation. The following discussion details the attachment of one of a plurality of cylindrical elastomer springs. Every spring in a particular two-mass vibratory device, however, is attached in a substantially similar manner even if not explicitly discussed or visible in every drawing. Furthermore, while four cylindrical elastomer springs are typically shown in the illustrations, also considered within the scope of the present invention are the connection of more or less springs, e.g. large conveyors which usually require even greater numbers of connecting springs A preferred embodiment of the present invention is illustrated in FIG. 4 with the work member being a trough 410; however, screens, scavengers, feeders, conveyors, separators and other vibratory applications are all contemplated within the scope of the present invention.

Trough 410, the work mass, is attached to flange 404 of cylindrical elastomer spring 420. Flange 404 is part of spring 420 outer housing 412 and provides an area which simplifies connection to work mass 410 and allows heat transfer between housing 412 and trough 410. Inner shaft 406 of spring 420 is connected at both ends to exciter mass 402 using bolts 408. The view depicted in FIG. 4 only shows one end of shaft 406; however, the other end (not shown) is similarly attached to exciter mass 402. These connections between shaft 406 and exciter 402 allow the larger surface area of the exciter mass to be used for heat dissipation from inner shaft 406.

If one substituted the present configuration spring 412 and mounting structure as a replacement for the original spring 202 as shown in FIG. 2 (equivalent to element 180 shown in U.S. Pat. No. 4,218,92 (FIG. 6)) in the same mounting space, it would provide approximately 33 percent more spring stiffness (lbs/in deflection). Therefore, a work load requiring the 6 original springs, can be implemented using only 4 of the present invention springs. Without the heat removal function of the present invention, this would not be possible.

Figure 5:
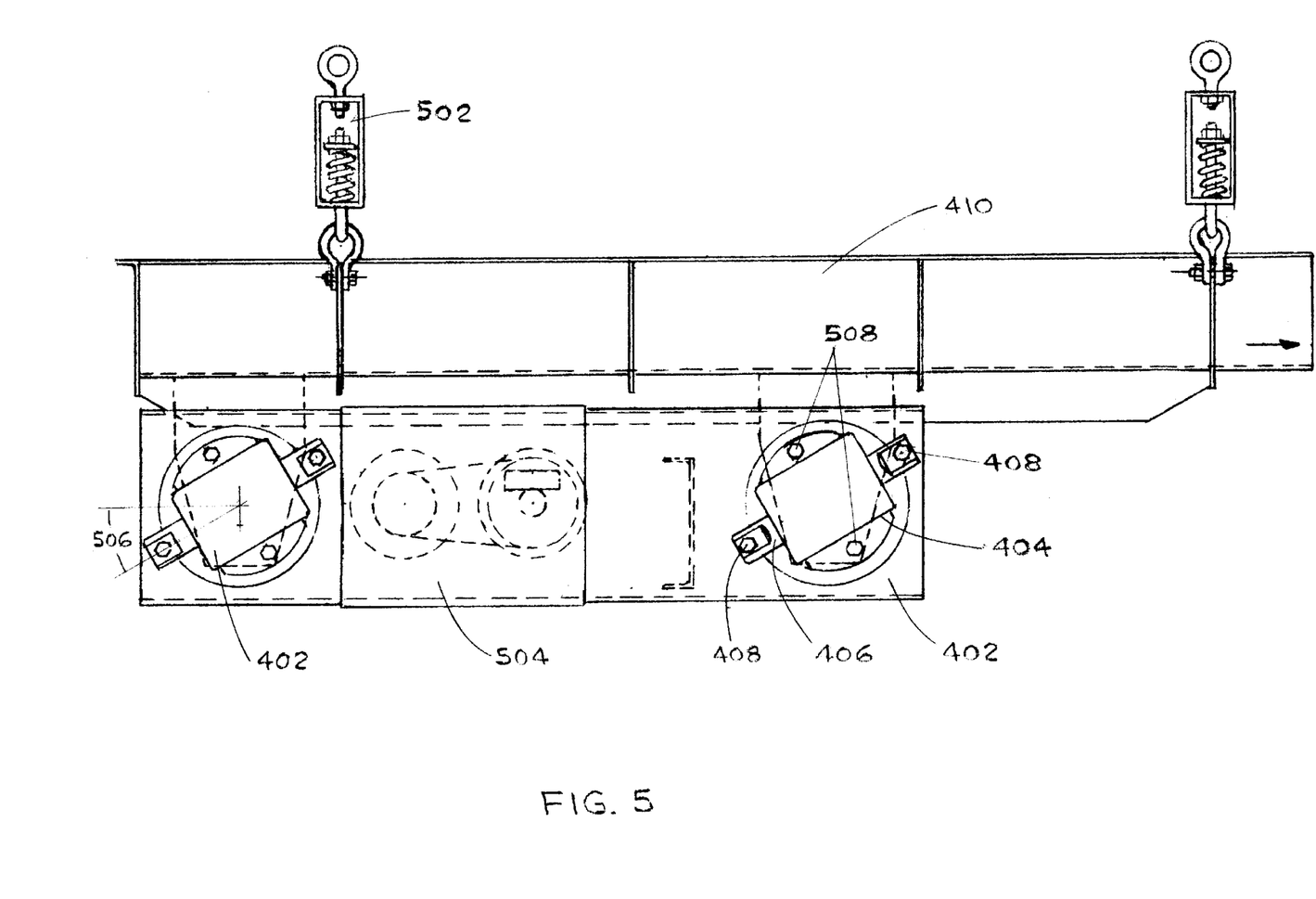
FIG. 5 illustrates a side view of the mounting arrangement between resilient members and an exciter mass and work mass according to the present invention.

FIG. 5 provides a side view of the two-mass vibratory device illustrated in FIG. 4. In this illustration, bolts 508 are visible and connect flanges 404 to work mass 410. Also visible are springs 502 which isolate the two-mass device from surrounding structures.

Angle 506 is the device's feed angle and determined by the bulk material being conveyed, high angle vibratory screen (5 g to 6 g vertical acceleration), medium angle for maximum feed rate (~3 g vertical acceleration) and low angle for fragile material such as potato chips (1 g~1.29 g vertical acceleration). Also part of exciter mass 702 is electric motor, belt-driven eccentric shaft as per FIG. 9 which produces a flat elliptical deflection along the set angle of springs 420.

Figure 6A:
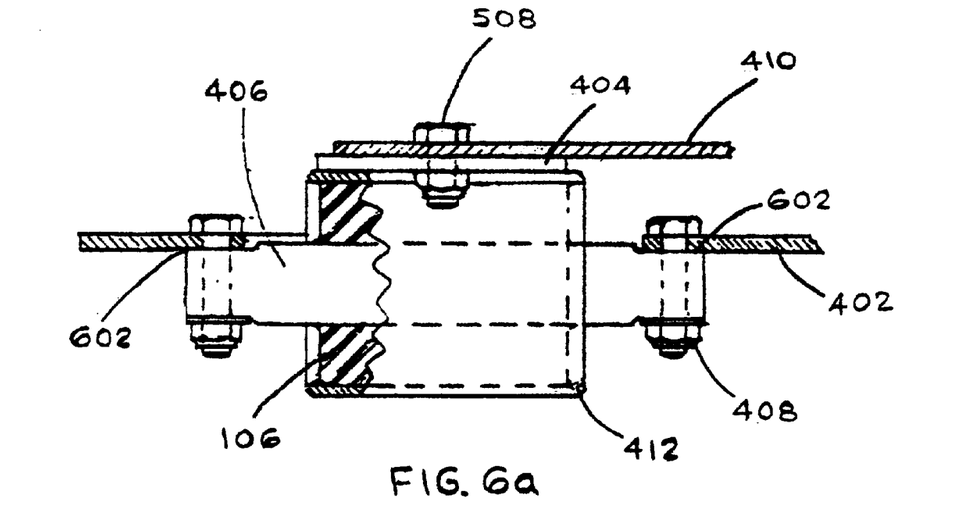
FIGS. 6a and 6b illustrate detailed views of the connections between resilient members and an exciter mass and work mass according to the present invention.
Figure 6B:
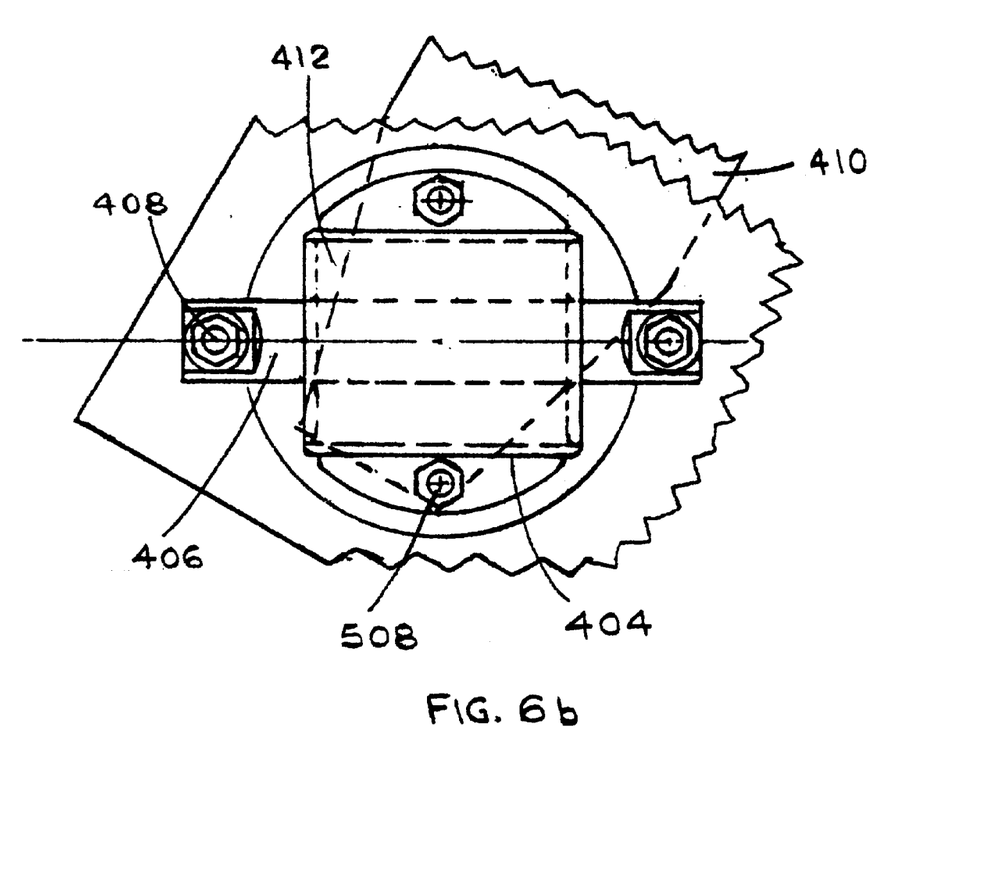

FIGS. 6a and 6b provide detailed views of the present invention's connections between a cylindrical elastomer spring and the two masses of a two-mass vibratory device. In FIG. 6a, the ends of inner shaft 406 are shown to have flat surface regions 602. Regions 602 increase the surface area of shaft 406 in direct contact with exciter mass 402 thus improving heat conductance from elastomer 106 and shaft 406. Also shown, flange 404 is used to bolt outer housing 412 to work mass 410. FIG. 6b shows a view other than that depicted in FIG. 6a and illustrates the arrangement of both flanges 404 and bolts 508.

Figure 7:
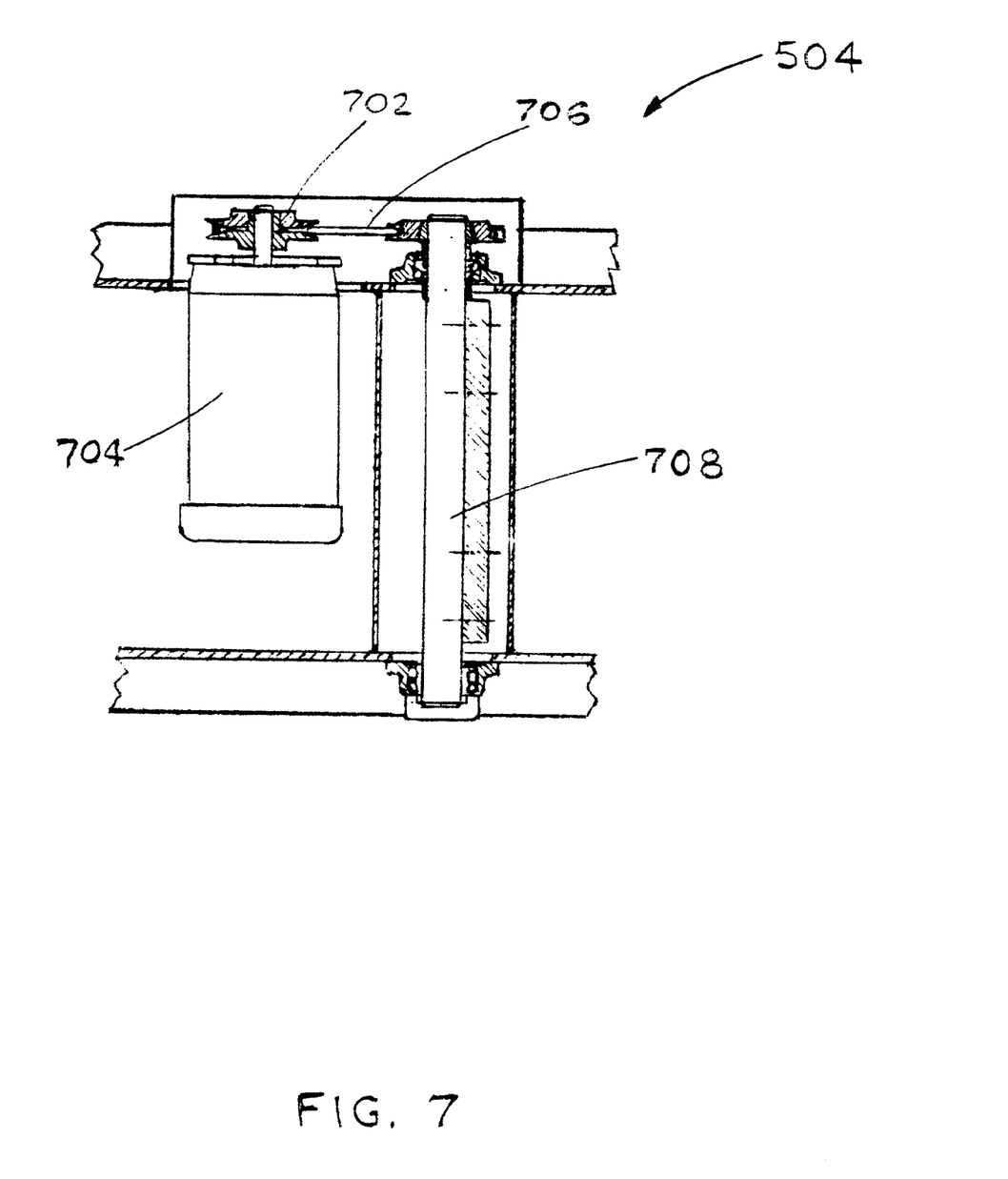
FIG. 7 illustrates a detailed view of a belt-driven, eccentric shaft exciter motor.

FIG. 7 illustrates details of exciter motor 504 first depicted in FIG. 5. The method of the present invention for connecting cylindrical elastomer springs to exciter masses does not depend on the particular type of exciter motor utilized. In FIG. 9, a standard electric motor with a belt driven eccentric shaft is illustrated. Motor 704 turns adjustable pitch sheave 702 (for setting operating frequency relative to natural frequency) which is connected to eccentric shaft 708 by V-belt 706. However, the present invention also contemplates within its scope special electric motors with eccentric weight vibrators, rotary air exciters with eccentric weight vibrators, reciprocating weight air vibrators, and reciprocating weight electromagnetic vibrators.

Conclusion

A system and method has been shown in the above embodiments for the effective implementation of a mounting arrangement for cylindrical elastomer springs in a two-mass vibratory device which increases the potential spring rate per mounting area based on the present invention heat dissipation from the internal elastomer. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by size, materials, connection methods, or type of vibratory device.

What is claimed is:

1. A method of increasing the performance of at least one cylindrical elastomer spring attached to a first mass and a second mass of a two-mass vibratory device comprising the steps of:

connecting a first end of an inner shaft of said at least one cylindrical elastomer spring with said first mass;

connecting a second end of said inner shaft with said first mass;

connecting an outer cylinder of said at least one cylindrical elastomer spring with said second mass, the connections enabling conductance of heat between said first end and said first mass and said second end and said first mass, respectively, thereby cooling said at least one cylindrical elastomer spring, and whereby said cooling increases the performance of said at least one cylindrical elastomer spring.

2. A method of increasing the performance of at least one cylindrical elastomer spring attached to a first mass and a second mass of a two-mass vibratory device, as per claim 1, wherein the increase in the performance of said at least one cylindrical elastomer spring enables an increase in spring rate in a given mounting area.

3. A method of increasing the performance of at least one cylindrical elastomer spring attached to a first mass and a second mass of a two-mass vibratory device, as per claim 1, wherein said first mass is any of a work member or exciter mass.

4. A method of increasing the performance of at least one cylindrical elastomer spring attached to a first mass and a second mass of a two-mass vibratory device, as per claim 1, wherein each of the connections are adjustable to enable said at least one cylindrical elastomer spring to be rotatable around a central horizontal axis.

5. A method of increasing the performance of at least one cylindrical elastomer spring attached to a first mass and a second mass of a two-mass vibratory device, as per claim 1, wherein the increase in the performance of said at least one cylindrical elastomer spring is any of:
   an increase in spring rate in a given mounting area;
   a higher energy capacity in the same or smaller mounting area; and
   an increase in efficiency of the spring over a hot spring.

6. A method of increasing the performance of at least one cylindrical elastomer spring attached to a first mass and a second mass of a two-mass vibratory device, as per claim 1, whereby the cooling additionally enables design of operating parameters of the spring to be limited only by the physical characteristics of said at least one spring without regard to operating temperature.

7. A method of increasing the performance of at least one cylindrical elastomer spring attached to a first mass and a second mass of a two-mass vibratory device, as per claim 1, wherein an operating frequency is greater than 900 revolutions per minute (RPM) and a total stroke length is greater than 0.560 inches.

8. A method of increasing the performance of at least one cylindrical elastomer spring attached to a first mass and a second mass of a two-mass vibratory device, per claim 7, wherein the conductance of heat resulting in a cooling of the at least one cylindrical elastomer spring enables removal of heat resulting from an inherent internal frictional damping generated proportionally to said operating frequency and said total stroke length by conducting heat to said first mass and said second mass of said two-mass vibratory device, each of the first and second masses having a large surface area cooled by radiating heat into the atmosphere.

* * * * *